(12) United States Patent
Cottrell

(10) Patent No.: US 7,490,011 B2
(45) Date of Patent: Feb. 10, 2009

(54) DIAGNOSTIC TOOL FOR AN ENERGY CONVERSION APPLIANCE

(75) Inventor: Brian Cottrell, Devon (GB)

(73) Assignee: Invensys Controls UK Limited, Plymouth (GB)

( * ) Notice: Subject to any disclaimer, the term of this patent is extended or adjusted under 35 U.S.C. 154(b) by 0 days.

(21) Appl. No.: 10/529,178

(22) PCT Filed: Sep. 23, 2003

(86) PCT No.: PCT/GB03/04059

§ 371 (c)(1),
(2), (4) Date: Mar. 24, 2005

(87) PCT Pub. No.: WO2004/029743

PCT Pub. Date: Apr. 8, 2004

(65) Prior Publication Data

US 2006/0025938 A1      Feb. 2, 2006

(30) Foreign Application Priority Data

Sep. 24, 2002  (GB) .................................. 0222137.2
Dec. 23, 2002  (GB) .................................. 0229855.2

(51) Int. Cl.
*G01B 5/28* (2006.01)
(52) U.S. Cl. ........................................................ 702/39
(58) Field of Classification Search ..................... 702/39
See application file for complete search history.

(56) References Cited

U.S. PATENT DOCUMENTS 4,959,638 A      9/1990  Palmer

| 5,120,214 A | 6/1992 | West et al. |
| 5,309,379 A | 5/1994 | Rawlings et al. |
| 5,602,761 A | 2/1997 | Spoerre et al. |
| 5,650,943 A | 7/1997 | Powell et al. |
| 6,262,550 B1 | 7/2001 | Kliman et al. |
| 2002/0091491 A1 | 7/2002 | Jackson et al. |

FOREIGN PATENT DOCUMENTS

| DE | 199 41 917 | 6/2000 |
| EP | 0 593 045 | 4/1994 |
| GB | 2 156 520 | 10/1985 |
| WO | WO 00/04359 | 1/2000 |
| WO | WO 00/55542 | 9/2000 |

OTHER PUBLICATIONS

Olma B et al: "On-line classification of acoustic burst signals by a neural network application to loose parts monitoring in nuclear power plants" Control Application, 1994, Proceedings of the Third IEEE Conference on Glasgow, UK Aug. 24-26, 1994, New York, NY, USA, IEEE, Aug. 24, 1994, pp. 1133-1138, XP010130948.

*Primary Examiner*—Bryan Bui
*Assistant Examiner*—Stephen J Cherry
(74) *Attorney, Agent, or Firm*—Young & Thompson

(57) ABSTRACT

A diagnostic tool for an energy conversion appliance, which may be a heating, ventilating or air conditioning appliance, includes a sound receiving transducer (1) coupled to output elements (5) to identify, discriminate and log the acoustic signatures of a sequence of events within an operating sequence of an appliance. Individual event occurrences are identified by comparison of a received acoustic signature with stored data to determine whether an event occurrence has occurred in a proper manner and at a correct position in the sequence of a plurality of event occurrences.

27 Claims, 2 Drawing Sheets

| Boiler Type | Typical | | |
|---|---|---|---|
| Condition | Normal Operation | | Sequence A |
| Event Number | Event | Time | Comment |
| 0 | | | External Thermostats supply power |
| 1 | Power on | 0 | there is no permanent live on this boiler |
| 2 | Water flows | 0 | |
| 3 | Relay B operates | 1 | |
| 4 | Relay A operates | 2 | assumes PS ok. Boiler stat calls. |
| 5 | Fan Runs | 2 | |
| 6 | Air pressure switch operates | 3 | |
| 7 | Gas valve 1 operates | 3 | Pilot valve solenoid |
| 8 | Intermittent spark | 4 | |
| 9 | Pilot established | 5 | |
| 10 | Relay B de-energises | 6 | |
| 11 | Spark stops | 6 | |
| 12 | Gas valve 2 operates | 6 | Main gas valve solenoid |
| 13 | Main burner cross lights | 7 | |
| | | | Delay until boiler thermostat satisfied |
| 14 | Relay A de-energises | 8 | |
| 15 | Gas valve 1 De-energises | 8 | |
| 16 | Gas valve 2 De-energises | 8 | |
| 17 | Flames extinguished | 8 | |
| 18 | Fan stops | 8 | |
| 19 | Air pressure switch releases | 9 | |
| 20 | Relay B operates | 10 | |
| | | | Delay until Boiler thermostat calls |
| 21 | Boiler temperature sensor calls | 11 | |
| 22 | Power off | 12 | External thermostats satisfied. |
| 23 | Flames extinguished | 13 | |
| 24 | water flow stops | 14 | |
| 25 | Fan stops | 15 | |
| 26 | Relay A de-energises | 16 | |
| 27 | Air pressure switch releases | 17 | |

Fig. 1

DIAGNOSTIC TOOL FOR AN ENERGY CONVERSION APPLIANCE

BACKGROUND OF THE INVENTION

1. Field of the Invention The present invention relates to a diagnostic tool for and method of monitoring an energy conversion appliance and particularly, but not exclusively, to a tool for an appliance which utilises more than one form of energy and/or medium. The diagnostic tool may, for example, be used with heating, ventilating and air conditioning appliances.

2. Description of the Related Art

Increasingly, diagnostic tools are being embedded into control systems of appliances. Not only does this allow service engineers to diagnose faults speedily, but, with the rapid increase of connectivity technology, diagnostic data can be sent via telephone or other communication channels to "back-end" systems where sophisticated diagnostic and predictive algorithms can be run using processing power greater than that which it is economic to provide in each appliance.

The advantage of a predictive diagnostic tool to the service provider is that fault repair can be accomplished in one visit to the customer's premises, while the predictive nature of the system means that preventative maintenance can be undertaken during annual service visits.

The advantages to the customer include reduced system problems and a more rapid repair of faults.

Currently these systems are mainly applied to new appliances, which means that it will be many years before the installed population of these devices reaches a level to make economic sense to the service provider.

BRIEF SUMMARY OF THE INVENTION

One type of appliance to which the present invention seeks to relate is heating and air conditioning appliances employing combustion processes for the heating source, and the present invention seeks to provide a diagnostic tool which is retrofittable for use in a domestic central heating boiler.

In types of systems such as domestic heating systems the sequence of the control functions is critical to the safe operation of the appliance. Many of the international regulations for these types of appliances dictate the correct operating sequence that must apply.

Thus monitoring this sequence and detecting variations in and interruptions to the sequence provides significant and important diagnostic data.

To duplicate the data available to and obtained from an embedded diagnostic tool provided as part of an original appliance installation by the use of a retrofitted diagnostic device hitherto has required obtaining access to the control and sensor signals within the appliance control system. The intrusive nature of this activity potentially compromises the integrity of the control or, at the least, is very time consuming in installation.

The present invention seeks to provide a diagnostic tool and method which is well suited for use as a retrofit diagnostic tool and that can be installed easily into an existing appliance. The invention seeks also to provide a diagnostic tool and method which is able to extract from an appliance data which is additional to, or differs from, that available using a conventional embedded system, but which provides an equal, if not improved, functionality. Another object of the invention is to seek to provide a diagnostic tool and method which is minimally intrusive into the appliance control system and thus simple to install.

A further object is to provide a diagnostic tool and method which is able to provide data relating to at least two types of operation one being a fluid flow operation and the other being one of a mechanical or electro-mechanical operation.

BRIEF DESCRIPTION OF THE DRAWINGS FIGURES

FIG. 1 shows a typical event sequence of a simple domestic gas central heating boiler.

DETAILED DESCRIPTION OF THE PREDERRED EMBODIMENTS

Figure 2:
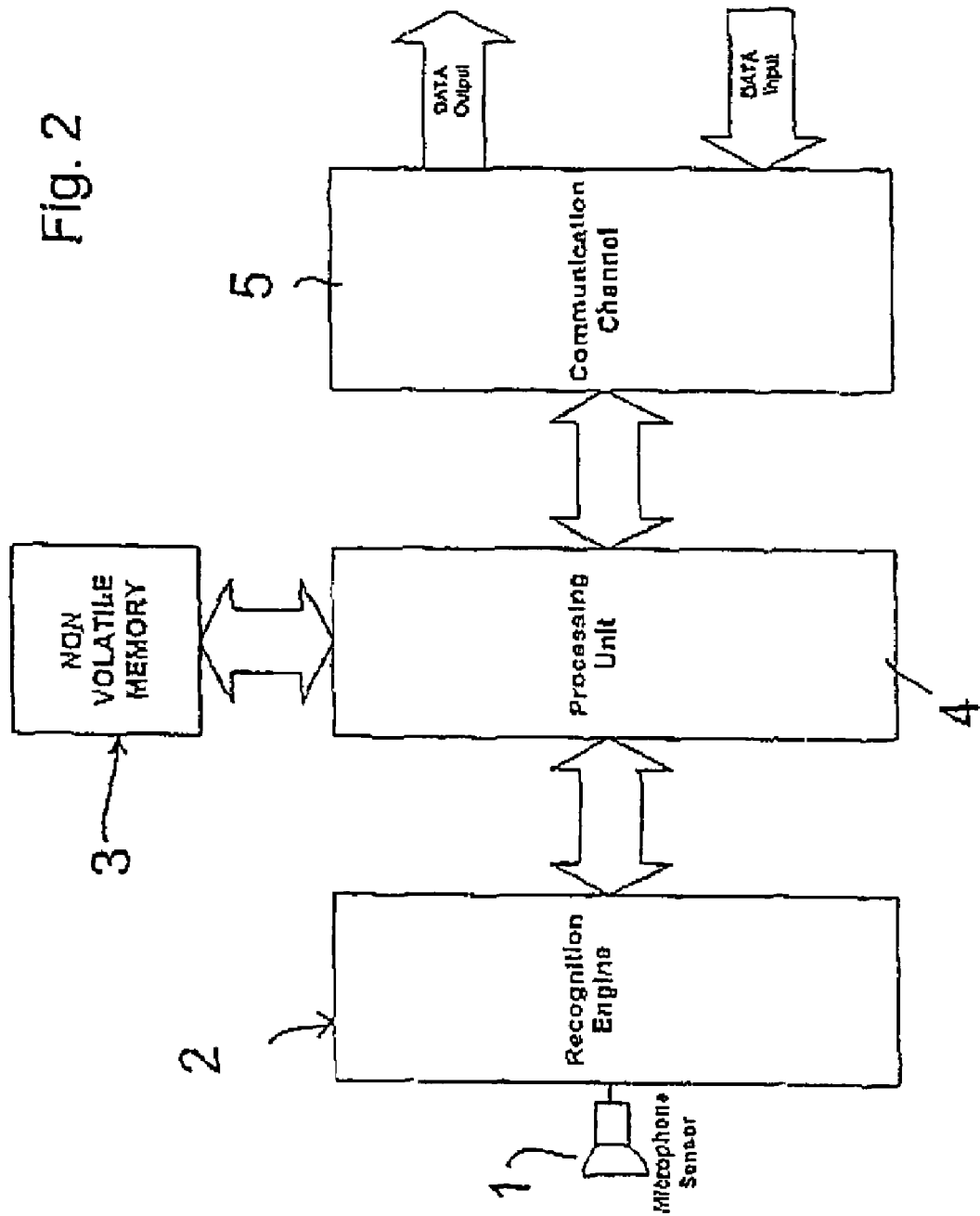
FIG. 2 is a schematic block diagram of a diagnostic tool.

In accordance with one aspect of the present invention there is provided a diagnostic tool for an energy conversion appliance, said diagnostic tool comprising a sound receiving transducer coupled to a sound recognition engine, alternatively referred to herein as output means, to identify, discriminate and log the acoustic signatures of events within the operating sequence of an appliance.

The word "event" is used herein to encompass a change of state of a component, or components, of the operating or control system of the appliance. As an example FIG. 1 tabulates a typical event sequence of a simple domestic gas central heating boiler.

The sound recognition engine may be an adaptation of a voice recognition type system known per se. These systems, commonly found in mobile telephones and other applications requiring voice tagging or control, are very robust in the presence of background noise and the technology is becoming increasingly well known and reliable.

In accordance with another aspect of the present invention there is provided a method of monitoring an energy conversion appliance, said method comprising:

providing a sound receiving transducer, positioning said transducer to receive sound signals emitted by the appliance, and providing output means associated with said sound receiving transducer, said output means being responsive to the sound emitted by the appliance.

The diagnostic tool and method of the invention may be employed to monitor a plurality of events (or operations) each of which has its own individual acoustic signature. That acoustic signature may be employed to identify the occurrence of a particular event within the whole or a part of the whole of the operating sequence of an appliance. Monitoring means may be operable to verify that the acoustic signature indicative of a particular event has occurred at a correct position in the operating sequence of the appliance. Thus the monitoring means may compare the order of occurrences of different acoustic signatures with a stored operating sequence that is indicative of correct functioning of an appliance. Particularly if, for example, the appliance is capable of correct functioning in several modes of operation, information may be stored regarding operating sequences associated with correct functioning of the appliance in each of those modes and the monitoring means may compare an actual operating sequence with each of those stored sequences to establish whether or not the actual operating sequence corresponds with one of those stored sequences, and thus alert to a possible need for maintenance, equipment replacement or shut-down. Additionally or alternatively the monitoring means may be operable to monitor changes in the signature of an event thereby, for example, to identify when equipment associated with that event requires maintenance or replacement, or there is a need for shut-down.

The method of the invention may comprise establishing a sound profile which is concomitant with proper functioning of at least a part of the appliance, and said output means may be responsive to occurrences of the sound emitted by the appliance departing from said sound profile. The output means may be responsive only if the emitted sound (whether for example, frequency, duration or level thereof) lies beyond (above or below) a threshold level.

The references herein to a sound signal include but are not limited to sound signals audible to the human ear. The expression "sound signal(s)" is used herein to refer to any frequency of pressure wave signal transmitted through a gas.

The output means may comprise means operated within the vicinity of an appliance to identify, discriminate and log the acoustic signatures of events within the operating sequence of an appliance or transmit signals related thereto to remote data processing means.

The profile may be specific to substantially only one relationship between received sound and time (for example variation or uniformity of sound level over a fixed time interval). Alternatively the sound profile may comprise upper and lower limits of sound level and/or time duration such that the overall profile encompasses a plurality of specific relationships all of which are concomitant with the proper functioning of the appliance.

The profile may be one which comprises upper and lower sound level limits the difference between which varies non-uniformly over the typical time period of a monitored event.

The diagnostic tool and method for monitoring an energy conversion appliance in accordance with the present invention may be employed for the purpose of trend analysis or non emergency monitoring, for example monitoring by a so called "backend" computer system which receives data from a plurality of customers. Data may be transmitted from the output means on a regular, e.g. daily basis for example to provide information concerning what has happened within a central heating boiler even though the data relates to events that may all be within an acceptable sound profile. For example data may be transmitted concerning the period of use of a fan motor and the e.g. daily reports can then be assimilated by the centrally located backend computer power to analyse any significant variation of boiler performance and or highlight the need for servicing. As a further example, the data may be assimilated to provide a timely indication as to whether there is potential need for precautionary replacement of any one component, such as an extensively used fan motor, at the time of next routine servicing of the appliance.

Additionally or alternatively the diagnostic tool provided at the appliance may incorporate means to generate an alarm signal, either in the vicinity of the appliance or remotely at a central monitoring station, in the event that the diagnostic tool detects a sound profile which departs from a predetermined profile and is indicative of failure or impending failure of at least a component part of the appliance.

Although in one of its aspect the present invention seeks to provide a diagnostic tool which is minimally intrusive into the appliance control system, that is not an essential requirement and the invention envisages that optionally the diagnostic tool may incorporate or have associated therewith software or like means responsive to change of sound profile such that if that change is outside predetermined limits the appliance is either shut down or an alarm signal is generated.

The sound receiving transducer may be employed to facilitate monitoring of the frequency spectrum (i.e. sound signature) of a combustion flame. In normal operation the flame will generate sound comprising a plurality of frequencies, and monitoring may be undertaken to detect the presence or absence and/or sound level of individual frequencies or band of frequencies.

The output means may be responsive to departure from the sound profile in the event of any single departure from that profile, whether a sound level, frequency or time interval departure, or may be adapted to be responsive, and provide an output signal, only in the event of two or more departures. The responsiveness may be a function, additionally or alternatively, of magnitude or number/frequency of occurrences of said departures.

The output means may monitor and be responsive to any departure from a pre-established sequence of sound signals which form part of a sound profile. The sound profile may be solely that from a single source or type of source (e.g. a gas burner or electromechanical relay switch) or from a plurality of sound sources or types of sound sources.

The energy conversion appliance may be of a kind which comprises the use of fluid, and the sound receiving transducer may be adapted to be responsive to sound generated by flow of said fluid. It may, for example, be responsive to the sound of flow of liquid or gas through a pipe, or for example flow of gas or liquid fuel to or through a combustion zone, or flow of combustion products from the combustion zone. The sound receiving transducer may be responsive to sound emitted by a heat transfer medium, for example water which flows through central heating radiators or air in a ducted air system. The invention is not, however, confined in use to monitoring of energy conversion appliances which comprise fluid flow. It may alternatively or additional be applied to energy conversion appliances which convert for example electrical power to mechanical movement or vice versa.

The invention envisages use of a single sound receiving transducer to receive signals from a plurality of sound resources. Those sound sources may all be contained in a single enclosure (e.g. the cabinet of a central heating boiler which may also contain a water pump) and said transducer may be located within that enclosure. The transducer may be located physically closer to a first of two sound sources if the sound level emitted by said first sound source during either a general, normal operational mode, or during a (potential) defect mode is less that that from a second of the two sound sources.

Although the invention envisages use of a single sound receiving transducer to receive signals from a plurality of sound sources, that is not an essential requirement of the invention. The invention envisages that two or more sound receiving transducers may be provided each to receive sound from either a single or a plurality of sound sources. In the case of two or more sound receiving transducers, one may have characteristics different from the or each of the other sound receiving transducers. Thus one may be adapted to be preferentially sensitive to low frequency sound (such as that originating from a combustion flame) whilst another may be preferentially sensitive to high frequency sound (such as that generated by an electromechanical relay switch). If two or more sound receiving transducers are provided, they may be positioned alongside one another or separately located preferentially such that each is relatively near to that sound source which it is most advantageously adapted to detect.

The diagnostic tool and method of the present invention are not confined to the use exclusively of sound receiving transducers, and said sound transducers may be employed in combination with other types of transducer for provision of additional data which cannot be obtained by the use of a sound receiving transducer. Thus, for example, sound monitoring would not alone necessarily be appropriate to confirm that it is correct for a combustion flame to be operating continuously for a substantial period of time, and it may be deemed necessary to provide another type of transducer, such as a temperature sensor in the return flow of water from central heating radiators to a domestic boiler to establish whether or not the flame needs to be in said continuous operation.

The diagnostic tool may be employed to record the event sequence or sound profile when the boiler is known to be operating correctly and efficiently, for example immediately following a service, and use this sequence or profile, for reference, for comparison with subsequent measurements. Subsequent recordings of the data can be collected in a memory, preferably non volatile, in the diagnostic tool and used by the tool to extract diagnostic information, or be made available, as a data stream, on a prescribed basis, to transmit over a communication channel to a local, or remote monitoring devise e.g. a computational system.

The diagnostic tool may be employed to monitor certain individual or combinations of, elements of an appliance where variations in the acoustic signature, with time, potentially provide significant diagnostic data. An example is the monitoring of a combustion flame to detect, for example, blockage conditions in the gas valve or monitoring of a fan to detect, for example, fouling of an impeller.

The diagnostic tool may be employed, in the event of a failure of an appliance or part thereof, to analyse the failure mode by reference to where in a sequence of events the failure occurred and extract significant diagnostic information, for example to identify a failed component.

One embodiment of the present invention will now be described, by way of example, with reference to FIG. 2 which is schematic block diagram of a diagnostic tool in accordance with the present invention.

This embodiment of the invention relates to a use of a diagnostic tool for monitoring the operation of a gas fuelled central heating boiler of a domestic wet type central heating system.

The diagnostic tool comprises a sound receiving transducer in the form of a microphonic sensor (1) coupled to output means in the form of a sound recognition engine (2). The recognition system (2) is tuned and programmed to identify individual events within the sequence of events of a central heating gas boiler by recognising the acoustic signature of an event and establishing whether that event has occurred at a correct position in the operating sequence of the boiler.

This acoustic sensor system can be used alone, or in conjunction with other (e.g. non acoustic) sensors to obtain diagnostic information about the appliance.

A non-volatile memory (3) is provided for storage of the processed data. This comprises stored data regarding the or each of a range of acoustic signatures associated with a particular event when operating normally, and to distinguish between those departures from normal which merely indicated a non-urgent need for maintenance and those which require shut-down of the boiler. The memory (3) also comprises stored data regarding one or more sequences of operation which may occur during normal operation of the boiler.

A processing unit (4) is provided as part of the diagnostic tool to process the data from the recognition engine (2) and to organise and store said data, in the memory, into a sequence of events with respect to time; to recognise a failure of the appliance and analyse the diagnostic information associated with the position in the sequence at which the failure occurred, initiate an alarm sequence and transmit an immediate alarm message; to monitor the acoustic signature of individual elements of components of the system and record variations in these signatures as diagnostic data or a measure of efficiency and to initiate and control the transmission of data to an external system.

A communication channel (5) is provided for communication of the diagnostic data to a local or remote computational system on an immediate, prescribed or regular basis.

In the sequence listing of FIG. 1 the sequence 1 to 27 represents the full cycle of operational events occurring when an external thermostat switches electrical power to the boiler. Subsequently, whilst that power supply is maintained, the boiler cycles through the sequence 4 to 21 in response to the control provided by the boiler thermostat (which responds to water temperature). The processing unit (4) is operable to monitor for correct operation of both the sequence 1 to 27 and the sequence 4 to 21. The unit (4) has stored in the memory thereof reference data related to satisfactory operation of both of those sequences and also data related to the need to trigger a call for maintenance or to shut down the boiler if the received acoustic information departs to a pre-established extent from the pre-determined reference data.

The invention claimed is:

1. A method of monitoring an energy conversion appliance of a kind which involves a combustion process and which, in normal use, performs two or more operational events in a pre-determined sequence, each said event having a different acoustic signature, said method comprising:
   providing a sound receiving transducer and positioning said transducer to receive sound signals emitted by the appliance during each of two or more operational events, a first of said operational events comprising a fluid flow event which is related to the process of combustion and a second of said operational events comprising operation of a mechanical or electro-mechanical device;
   providing output means associated with said sound receiving transducer, said output means being responsive to the sounds emitted by each of said first and second operational events; and
   employing a monitoring means to compare each of said received sound signals with pre-established data.

2. A method according to claim 1, wherein the monitoring means is operable to determine whether each acoustic signature indicative of an operational event has occurred at the normal position or one of a plurality of normal positions of that operational event in a normal operating sequence of the appliance.

3. A method according to claim 1, wherein the monitoring means is provided with and stores operating sequences indicative of correct functioning of the appliance and is operable to compare the order of occurrence of different acoustic signatures with the or each stored operating sequence.

4. A method according to claim 1, wherein the monitoring means is operable to determine whether an acoustic signature indicative of an operational event is concomitant with normal performance of that operational event.

5. A method according to claim 1, wherein the output means is responsive to occurrences of the sound emitted by the appliance, or by a single operational event, departing from said sound profile concomitant with proper functioning of the appliance or said operational event.

6. A method according to claim 5, wherein the output means is responsive only if the emitted sound lies beyond a pre-established threshold level.

7. A method according to claim 1, wherein the appliance comprises a protective enclosure which protects the appliance from the surrounding environment and within which enclosure said two or more operational events occur, said method comprising providing said sound receiving transducer within said enclosure.

8. A method according to claim 1 and comprising employing the output means to transmit signals related to the acoustic signatures of events within the operating sequence of the appliance to remote data processing means.

9. A method according to claim 8, wherein said transmission of signals from the output means occurs daily on a regular basis.

10. A method according to claim 1, wherein said operational event which comprises operation of a mechanical or electro-mechanical device comprises at least one of operation of a pump, operation of a relay, and flow of liquid or gas through a pipe.

11. A method according to claim 1, wherein said fluid flow event which is related to the process of combustion comprises the flow of gas or liquid fuel to or through a combustion zone or flow of combustion products from the combustion zone.

12. A method according to claim 1, wherein the monitoring means employs the signature of an operational event to establish the type of event which has occurred and then verifies that that operational event has occurred at a correct position in a normal operating sequence of the appliance.

13. A method according to claim 1, wherein the output means either substantially directly, or substantially indirectly via remote data processing means, causes operation of an alarm when the sound emitted by the appliance departs from a sound profile concomitant with proper functioning of the appliance.

14. A method according to claim 13, wherein the alarm is an audible alarm in the vicinity of the appliance.

15. A method according to claim 13, wherein an alarm is actuated at a position remote from the appliance.

16. A method according to claim 1, wherein the monitoring means is operable to cause shutting down of the appliance in the event of the acoustic signature of an operational event departing by a pre-determined amount from an acoustic signature concomitant with proper functioning of that operational event.

17. A method according to claim 1, and comprising providing within an enclosure a plurality of sound receiving transducers.

18. A method according to claim 17, wherein one transducer is selected to have a frequency response different from that of the or each other transducer.

19. A method according to claim 1, and providing to the monitoring means signals from transducers of a non-acoustic type.

20. A diagnostic tool for an energy conversion appliance of a kind which, in normal use, performs two or more operational events in a pre-determined sequence and each said event having a different acoustic signature, said diagnostic tool being adapted for performing a method in accordance with claim 1.

21. A diagnostic tool for an energy conversion appliance of a kind which involves a combustion process and which, in normal use, performs two or more operational events in a pre-determined sequence and each said event having a different acoustic signature, a first of said operational events comprising a fluid flow event which is related to the process of combustion and a second of said operational events comprising operation of a mechanical or electro-mechanical device, said diagnostic tool comprising a sound receiving transducer coupled to output and monitoring means to identify, discriminate and log the acoustic signatures of each of said first and second operational events within the operating sequence of the appliance, said monitoring means being operable to compare each of said received acoustic signatures with pre-established data.

22. A diagnostic tool according to claim 21, wherein means is provided to transmit to remote data processing means signals related to the acoustic signatures of operating events within the operating sequence of the appliance.

23. A diagnostic tool according to claim 21, wherein the energy conversion appliance comprises a protective enclosure within which said operational events occur, the or each sound receiving transducer being provided within said enclosure.

24. A diagnostic tool according to claim 21 and comprising at least two sound receiving transducers at least one of which has a frequency response different from that of the or each other sound receiving transducer.

25. A diagnostic tool according to claim 21, wherein said sound receiving transducer is receptive to an acoustic signature related to the process of combustion and which comprises the flow of gas or liquid fuel to or through a combustion zone or flow of combustion products from the combustion zone.

26. A diagnostic tool according to claim 21, wherein said sound receiving transducer is receptive to the acoustic signature associated with an operational event which comprises at least one of operation of a pump, operation of a relay, and flow of a liquid or gas through a pipe.

27. A diagnostic tool according to claim 21, wherein the output or monitoring means has coupled thereto a transducer of a kind responsive to signals other than sound.

* * * * *